United States Patent [19]
Dethlefs et al.
[11] Patent Number: 5,004,644
[45] Date of Patent: Apr. 2, 1991

[54] SUPPORT MATERIAL FOR PHOTOGRAPHIC COATINGS

[75] Inventors: Ralf-Burkhard Dethlefs, Bissendorf; Bernd Scholz, Osnabruck; Wolfram Wysk, Belm; Elke Miefert, Herford, all of Fed. Rep. of Germany

[73] Assignee: Felix Schoeller jr. GmbH & Co. KG, Osnabruck, Fed. Rep. of Germany

[21] Appl. No.: 197,454

[22] Filed: May 23, 1988

[30] Foreign Application Priority Data

Jun. 20, 1987 [DE] Fed. Rep. of Germany ....... 3720518

[51] Int. Cl.[5] ........................... B32B 5/16; G03C 1/85

[52] U.S. Cl. .................................... 428/323; 428/422; 428/516; 264/176.1; 430/527

[58] Field of Search ........................ 428/323, 516, 422

[56] References Cited

U.S. PATENT DOCUMENTS

| | | | |
|---|---|---|---|
| 4,047,958 | 9/1977 | Yoneyama et al. | 430/527 |
| 4,420,580 | 12/1983 | Herman et al. | 524/424 |
| 4,452,846 | 6/1984 | Akao | 428/513 |

*Primary Examiner*—P. C. Sluby
*Attorney, Agent, or Firm*—Lockwood, Alex, FitzGibbon & Cummings

[57] ABSTRACT

A support material for photographic coatings comprises a paper or film material coated on at least one side with polyolefin resin, and the resin contains a fluorine containing polymer.

12 Claims, No Drawings

SUPPORT MATERIAL FOR PHOTOGRAPHIC COATINGS

DESCRIPTION

This invention relates to a waterproof polyolefin resin coated support material for photographic coatings.

Polyolefin coated photographic support materials usually consist of a sized base paper, preferably with a waterproof polyolefin resin coating on both sides. In an extended process the polyolefin resin coatings consist of polyethylene and are applied to the paper by means of extrusion coating (J. Appl. Photographic Engineering 5. (1979), pages 110–117).

One or more photographic coatings are applied to one of the polyolefin resin coatings (front side) after pretreatment of the coating surface in order to improve adhesion. These photographic coatings can be for black and white, color-photography and further auxiliary coatings according to function.

The front side coating usually contains light-reflecting white pigment, preferably a titanium dioxide, as well as where applicable or desirable color pigments, optical brighteners and further additives such as dispersion agents for the pigments, separating agents, release agents, antioxidants and antistatics or the like.

The synthetic resin coating applied to the opposite side to the light sensitive coating (back side) is not usually pigmented. It can, however, contain pigments and other additives contributory to its use as a coated paper support for photographic materials and which may correspond to those used in the front side coating.

Additional-functional coatings may be applied between the front side coating and the actual photographic coatings which may be applied to increase the adhesion of the photographic coatings, or which become necessary to fulfill some other function within the support material.

The back side coating also may be covered with further functional coatings to improve such things as ability of the paper to accept writing, conductivity and adhesives or to improve flatness, or other characteristics of the support material.

There is an undesirable tendency of a photographic paper coated on both sides with polyolefin to curl upon a single-sided application of a photographic coating. In order to prevent this, the polyolefin coatings are executed in such a way that the front side coating consists mostly of a polyolefin of low density, e.g. LDPE, whereas the back side coating consists mostly of a polyolefin of a higher density, e.g. HDPE. (J. Appl. Photographic Engineering 7. (1981), page 71).

The coating of photographic base papers with polyolefin is usually done by melt extrusion coating using a flat sheeting die. This process may be used for both single and multiple coating processes. Auxiliary coatings may be applied using all known coating processes both in separate coating plants and also in line with the extrusion coating (EP 21749).

It is generally known that the refinement of photographic support materials is in some respects a question of taste. This is not only true for the tinting of the base paper, but also for the front side coating, and is done with small amounts of color stuffs or color pigments. This is of particular importance for the design of the surface of a front side coating. Both high-gloss and mat and structured surfaces are well known. Using differently designed cooling or chill rolls, the roughness or surface structure may be precisely determined and modified to meet particular customer requirements.

Every coating process and material is coupled with its specific advantages and disadvantages, known to the expert, which cause him to decide in each case which process with which material in which combination is to be applied for a particular photographic support material. The expert is also aware of the fact that he must avoid particular additives which are in general use in the plastics or paper industries, because substances within them may react with substances in the photographic coatings which will prove disadvantageous and may even lead to the complete unusability of the support material, whereas others are indispensable for the production of polyolefin resin coated support materials for photographic coatings. The last named group contains for example white pigments such as titanium dioxides, color pigments, dispersion agents for pigments, antioxidants, optical brighteners or some processing agents.

Certain processing agents known as separating or release agents are mixed into most of the polyolefin coatings for photographic coating supports and are indispensable for coatings applied with the help of a polished chill roll to produce a high-gloss surface. Under the list of these separating or release agents can be found: stearic acid, glycerol stearates, metal salts of higher fatty acids and amides of higher fatty acids. Very widely used additives for polyolefin coated papers for photographic use are: magnesium stearate, zinc stearate, aluminum stearate or erucic acid amide. Polyethylene glycol is also known as a separating agent in polyolefin coatings.

The main function of these separating agents is to ensure an easy and steady separation of the extruded polyolefin film from the chill roll. In the absence of such separating or release agents, the polyolefin film is not always steadily parted from the chill roll, but in rhythmic intervals and fine corrugations are formed across the web. These very fine corrugations cannot be identified by the usual test measures for the measurement of the surface profile, but, however, are clearly visible as fine lines when a surface is illuminated by light falling upon it at an acute angle. They run parallel to each other at distances of approximately 1 mm and, therefore, have become known as "note lines". These "note lines" are produced at coating speeds of more than 70–80 m/min. and become stronger with increasing production speed.

It is only with the addition of one or more of the named separating agents to the coating mass that the production of high gloss surfaces by the extrusion coating process is possible. The amount of separating agents used is proportional to the coating speed, i.e. higher speeds require higher quantities of separating agents. Quantities of between 0.5 and 1.0% weight of the coating mass are normal.

Every addition of release or separating agent has its disadvantages. The separation of the polyolefin film from the chill roll is simplified but, at the same time, the adhesion of the film to the base paper is weakened. Moreover, as a result of the high extrusion temperatures the separating agent evaporates. These vapors condense partly on machine parts and this condensate may drip onto the production lane. Under unfavorable conditions fatty substances may collect on the chill roll and from there be transferred to the polyolefin surface, where they not only become visible as non-gloss spots, but also adversely affect the development and adhesion of photographic coatings to be applied later.

Whereas the so-called "note lines" may be observed on high gloss polyolefin surfaces, the same evaporation and condensation effects, together with undesirable spots forming on the chill roll, are also disadvantageous to structured or mat surfaces. As a result there is a strong interest in finding a way to reduce the addition of evaporating separating agents. There is an especially high interest in completely eliminating the fatty acid amides which have a strong tendency to create the negative effects mentioned above and, despite the economically desirable high working speeds, to produce a perfect, high-gloss surface. It is particularly desirable to be able to produce mat or high-gloss surfaces with the same coating mixture so that when a change of surface structure is required, e.g. a chill roll change, the coating mixture need not also be changed.

It is therefore the object of the invention to make available a polyolefin coated support material for photographic coatings which does not have the disadvantages described above. It is furthermore a particular object of the invention to produce a polyolefin coated support without the so-called "note lines" containing noticeably less separating agent in the front side coating, and to produce a polyolefin coating mixture which is suitable, without restriction, both for the production of mat surfaces and perfect high-gloss surfaces.

A still further object of the invention is to provide a process for the production of coating supports for photographic purposes in which there are no undesirable effects caused by evaporation and condensation of separating agents and by which under economically acceptable production conditions, the production of substantially faultless high-gloss surfaces is made possible. A production speed of more than 100 m/min is considered to be economically acceptable.

For the purposes of this invention, this object is achieved by the use of a fluorine containing polymer in the production of a polyolefin coating mass to be used as the polyolefin covering of a photographic base material, e.g. photographic base paper. In a preferred embodiment of this invention the fluorine containing polymer used in the mix is a polymerizate or copolymerizate of vinyl fluoride, vinylidene fluoride, trifluorochloroethylene or hexafluoropropylene which contains 30–76% weight of fluorine and is added to the coating mass in a quantity of 40–1500 ppm.

The subject of the invention is therefore a material, e.g. paper, coated on at least one side with polyolefin containing preferably a fluorine containing polymer with a fluorine content of 30–76% weight and which is added to the polyolefin coating mass in a quantity of 40–1500 ppm.

A further subject of this invention is a paper support coated with polyolefin for photographic coatings, in which the polyolefin coating (front side coating) closest to the photographic coating contains a polymerizate or copolymerizate of vinyl fluoride, vinylidene fluoride, trifluorochloroethylene or hexafluoropropylene in quantities of between 40–1500 ppm.

A further subject of this invention is a process for the production of a polyolefin coated support material for photographic coatings by means of extrusion coating wherein at least the polyolefin coating mass to be applied to the front side contains a fluorine containing polymer in the form of a premix. The quantity of fluorine containing polymer to be used is preferably 40–1500 ppm of the polyolefin coating mass and is a polymerizate or copolymerizate with a fluorine content of 30–76% weight.

The base material according to the invention which is coated with polyolefin is preferably a photographic base paper which has been internally sized in the usual way and has also received surface sizing. The base material may also be a paper containing synthetic fiber material or a film material.

The polyolefin coating is carried out in the usual manner by extrusion coating, whereby one side of the material may receive one or several polyolefin coats, one above the other. A further coating may be layed under one of the polyolefin coats, for instance a normal baryta coating, a coating hardened with electron beams, an adhesion improving coating, or a barrier coating, and further usual coatings may be applied onto the polyolefin coating before the photographic coating is applied.

The fluorine containing polymer is kneaded together, as appropriate, with a polyolefin to give a premix of 1–5% weight fluorine containing polymer. This is then granulated and in this form mixed into the coating mass before extrusion. The preferred polyolefin for the make up of the premix is polyethylene, especially a polyethylene of low density, so-called LDPE.

According to the invention the fluorine containing polymer used in the polyolefin mixture is preferably a polymerizate or copolymerizate of fluorine containing monomers, such as vinyl fluoride, vinylidene fluoride, trifluorochloroethylene or hexafluoropropylene. Other fluorine containing monomers, in small quantities, may be used for the production of the polymer, and copolymerizates of vinylidene fluoride, hexafluoropropylene or tetrafluoroethylene can be suitable as additives for the coatings encompassed by the invention. Furthermore, the fluorine containing polymer may also contain in small quantities non-fluorine containing monomers such as ethylene, vinyl chloride, acrylic acid or others.

The molecular weight of the fluorine containing polymer is variable to a great extent. Polymers with a molecular weight of 5000 were used with results just as good as with those of an average molecular weight of 500,000.

In one of the most preferred forms of the invention the polyolefin resin coating which contains the fluorine containing polymer is a polyolefin coating containing white pigment. This white pigment is normally a titanium dioxide pigment of a rutile or anatas type or a mixture containing titanium dioxide and other white pigments. The white pigments used in the extrusion coating masses as a rule are those which have received an organic and/or inorganic surface treatment. The coating may contain small quantities of colored pigments, optical brighteners, antioxidants or other substances used as known additives for photographic coating supports.

In a further embodiment of the invention the polyolefin coating contains a separation agent combination consisting of the fluorine containing polymer and a polyether glycol.

The polyether glycol mentioned is a polyethylene glycol with a molecular weight of between 200 and 35,000, a polypropylene glycol with a molecular weight of between 400 and 10,000, or an ethylene oxide/propylene oxide copolymer with a molecular weight of between 400 and 30,000. The quantity of the polyether glycol used is between 10 and 5000 ppm of the complete coating mixture.

According to the invention the polyolefin coating masses with fluorine containing additives show, in comparison to all known mixtures, notable processing advantages. Fatty acid derivatives as separating agents have become superfluous and mat or high-gloss surfaces may be manufactured according to requirements without a quality reduction as a result of the evaporation and condensation tendencies, and without the fearful "note lines". Unexpectedly, the adhesion to the paper or film base was not reduced, but slightly increased, and despite the basic incompatibility of the fluorine containing polymer with the polyolefin resin, no inhomogeneities were observed on extruded film. Smaller additions of the salts of higher fatty acids are compatible; magnesium stearate, for instance, which is used as a dispersion agent for pigments or as a neutralizing component for catalyst residues which are occasionally found in polyolefin mixtures, is fully compatible since these quantities normally remain below 0.3% weight. The undesirable fatty acide amides and fatty acid esters become completely superfluous. This also applies to fatty acid salts when they are used as separating agents.

This result is above all surprising because the separation of the polyolefin mixture from the chill roll is easy and leaves no residues, and because the adhesion between the substrate and the coating is slightly improved. Furthermore, the adhesion of photographic coatings onto a polyolefin coating containing a fluorine containing polymer as described herein, is in no way negatively influenced.

There are no particular limitations with regard to the polyolefin resin used in the extrusion coating. All formerly described polyolefin resins may be used for extrusion coating, as long as their melt index is between 1 and 35 g/10 min. They may be polyethylene (HDPE, LDPE, LLDPE), polypropylene, ionomer resin or any other olefin-copolymer resin. The only important consideration is that the resin is suitable for melt extrusion coating and the coating so produced becomes non-adhesive after cooling.

The invention is illustrated in more detail in the following examples.

Meaning of the abbreviations used

LDPE=low density polyethylene

LLDPE=linear low density polyethylene

HDPE=high density polyethylene d=density (g/cm$^3$)

MFI=melt index (g/10 min.)

$\overline{MG}$ =average molecular weight

Explanations Corresponding To Examples

For the composition of the mixtures used in the examples the following premixes were used: fluorine containing polymer, auxiliary mixtures and white pigment.

Fluorine Containing Polymer Premixes

-continued

Fluorine Containing Mixed with LDPE

| | Composition: copolymer of | Fluorine content % weight | Average molecular weight | Content in the premix % weight |
|---|---|---|---|---|
| F1 | Vinylidene fluoride and hexafluoropropylene | 65 | 150,000 | 2 |
| F2 | Tetrafluoroethylene and vinylidene fluoride | 69 | 70,000 | 3 |
| F3 | Tetrafluoroethylene, vinylidene fluoride and hexafluoropropylene | 73 | 300,000 | 3 |
| F4 | Tetrafluoroethylene and propylene | 38 | 120,000 | 4 |
| F5 | Trifluorochloroethylene and ethylene | 45 | 10,000 | 5 |
| F6 | Vinyl fluoride, hexafluoropropylene and tetrafluoroethylene | 70 | 220,000 | 3 |
| F7 | Vinylidene fluoride, hydropentafluoropropylene and hexafluoroethylene | 67 | 20,000 | 3 |

Auxiliary Premixes

| | | |
|---|---|---|
| H 1: | 98.65% weight | LDPE; d = 0.915 g/cm$^3$, MFI = 15 g/10 min. |
| | 1.3% weight | Ultramarine blue |
| | 0.05% weight | Polypropylene glycol; $\overline{MG}$ = ca 6000 |
| H 2: | 98.3% weight | LDPE, as in H 1 |
| | 1.3% weight | Ultramarine blue |
| | 0.4% weight | Polyethylene glycol; $\overline{MG}$ = ca 10,000 |
| H 3: | 98.2% weight | LDPE, as in H 1 |
| | 1.3% weight | Ultramarine blue |
| | 0.5% weight | Erucic acid amide |

White Pigment Premixes

| | | |
|---|---|---|
| W 1: | 49.9% weight | LDPE, d = 0.915 g/cm$^3$, MFI = 8 g/10 min. |
| | 49.9% weight | Titanium dioxide, rutile type, with $Al_2O_3$ surface treatment |
| | 0.2% weight | Magnesium stearate |
| W 2: | 49.0% weight | LDPE, as in W 1 |
| | 49.0% weight | Titanium dioxide, as in W 1 |
| | 2.0% weight | Magnesium stearate |
| W 3: | 50.0% weight | LDPE, as in W 1 |
| | 50.0% weight | Titanium dioxide, as in W 1 |
| W 4: | 50.0% weight | LDPE, as in W 1 |
| | 50.0% weight | Titanium dioxide, anatas type, with $Al_2O_3$ and organic surface treatments |
| W 5: | 50.0% weight | LLDPE, d = 0.920 g/cm$^3$, MFI = 4.4 g/10 min. (copolymer with 3.2 mol-% octene) |
| | 50.0% weight | Titanium dioxide, as in W1 |

EXAMPLE 1

A base paper for a photographic coating support with a weight of 170 g/m$^2$ underwent corona pretreatment to the back side and was then coated with the following mixture at 30 g/m$^2$ using a mat chill roll to produce a mat surface:

70 % weight HDPE; d=0.950 g/cm$^2$, MFI=10 g/10 min. 30 % weight LDPE; d=0.924 g/cm$^2$, MFI=4 g/10 min.

Immediately after, the front side was coated at 30 g/m$^2$ using the following mixtures, after undergoing a similar corona pretreatment and using a high-gloss chill roll to achieve a high-gloss surface:

| | Components in % weight | | | | | | |
|---|---|---|---|---|---|---|---|
| | LDPE | HDPE | white pigment | | fluorine containing polymer | | |
| Example 1 | d = 0.923 g/cm$^3$ MFI = 4 g/10 min | d = 0.950 g/cm$^3$ MFI = 10 g/10 min | premix | type | premix | type | content in final coat (ppm) |
| a | 38.5 | 38.5 | 20.0 | W 3 | 3.0 | F 1 | 600 |

-continued

| Example 1 | LDPE d = 0.923 g/cm³ MFI = 4 g/10 min | HDPE d = 0.950 g/cm³ MFI = 10 g/10 min | white pigment premix | white pigment type | fluorine containing polymer premix | fluorine containing polymer type | fluorine containing polymer content in final coat (ppm) |
|---|---|---|---|---|---|---|---|
| | Components in % weight | | | | | | |
| b | 39.0 | 39.0 | 20.0 | W 3 | 2.0 | F 2 | 600 |
| c | 39.0 | 39.0 | 20.0 | W 3 | 2.0 | F 3 | 600 |
| d | 39.25 | 39.25 | 20.0 | W 3 | 1.5 | F 4 | 600 |
| e | 39.4 | 39.4 | 20.0 | W 3 | 1.2 | F 5 | 600 |
| f | 39.0 | 39.0 | 20.0 | W 3 | 2.0 | F 6 | 600 |
| g | 39.0 | 39.0 | 20.0 | W 3 | 2.0 | F 7 | 600 |
| cf. h | 40.0 | 40.0 | 20.0 | W 3 | — | | — |

All coatings were applied using a tandem extrusion coating plant at a melting temperature of 310° C. and 110/160 m/min machine speed.

EXAMPLE 2

The photographic base paper as used in Example 1 was coated on its back side as in Example 1.

Immediately after, the front side underwent a corona pretreatment and was then coated at 30 g/m² with the following mixtures using a high-gloss chill roll to achieve a high-gloss surface.

| Example 2 | LDPE d = 0.923 g/cm³ MFI = 4 g/10 min | HDPE d = 0.950 g/cm³ MFI = 10 g/10 min | auxiliary premix | auxiliary type | white pigment premix | white pigment type | fluorine containing polymer premix | fluorine containing polymer type | fluorine containing polymer content in final coat ppm |
|---|---|---|---|---|---|---|---|---|---|
| | Components in % weight | | | | | | | | |
| a | 22.7 | 56.8 | — | | 20.0 | W 3 | 0.5 | F 1 | 100 |
| b | 22.6 | 56.4 | — | | 20.0 | W 3 | 1.0 | F 1 | 200 |
| c | 21.7 | 54.3 | — | | 20.0 | W 3 | 4.0 | F 1 | 800 |
| d | 20.9 | 52.1 | — | | 20.0 | W 3 | 7.0 | F 1 | 1400 |
| e | 21.7 | 54.3 | — | | 20.0 | W 1 | 4.0 | F 1 | 800 |
| f | 21.7 | 54.3 | — | | 20.0 | W 2 | 4.0 | F 1 | 800 |
| g | 21.7 | 54.3 | — | | 20.0 | W 4 | 4.0 | F 1 | 800 |
| h | 18.9 | 47.1 | 10.0 | H 1 | 20.0 | W 3 | 4.0 | F 3 | 1200 |
| i | 18.9 | 47.1 | 10.0 | H 2 | 20.0 | W 3 | 4.0 | F 3 | 1200 |
| k | 18.9 | 47.1 | 10.0 | H 3 | 20.0 | W 3 | 4.0 | F 3 | 1200 |
| cf. l | 22.9 | 57.1 | — | | 20.0 | W 3 | — | | — |
| cf. m | 20.0 | 50.0 | 10.0 | H 1 | 20.0 | W 3 | — | | — |
| cf. n | 20.0 | 50.0 | 10.0 | H 2 | 20.0 | W 3 | — | | — |
| cf. o | 20.0 | 50.0 | 10.0 | H 3 | 20.0 | W 3 | — | | — |

All coatings were applied using a tandem extrusion coating plant at a melting temperature of 310° C. and 110/160 m/min machine speed.

A base paper for a photographic coating support with a weight of 110 g/m² underwent a corona pretreatment to the back side and was then coated with the following mixtures at 22 g/m² using a mat chill roll to produce a mat surface:

69.9 % weight HDPE; d=0.950 g/cm³, MFI=10 g/10 min.

27.1 % weight LDPE; d=0.924 g/cm³, MFI=4 g/10 min.

3.0 % weight fluorine containing polymer premix F 1

Immediately after, the front side was coated at 25 g/m² using the following mixtures and either a mat or high-gloss chill roll to produce a mat or high-gloss surface.

| Example 3 | Surface | LDPE d = 0.934 g/cm³ MFI = 3 g/10 min | LDPE d = 0.915 g/cm³ MFI = 8 g/10 min | HDPE d = 0.963 g/cm³ MFI = 11 g/10 min | white pigment premix | white pigment type | fluorine containing polymer premix | fluorine containing polymer type | fluorine containing polymer content in final coat ppm |
|---|---|---|---|---|---|---|---|---|---|
| | | Components in % weight | | | | | | | |
| a | mat | — | 19.1 | 47.9 | 30.0 | W 5 | 3.0 | F 2 | 900 |
| b | glossy | — | 19.1 | 47.9 | 30.0 | W 5 | 3.0 | F 2 | 900 |
| c | glossy | 20.1 | 13.4 | 33.5 | 30.0 | W 5 | 3.0 | F 7 | 900 |
| d | glossy | 23.1 | 15.4 | 38.5 | 20.0 | W 2 | 3.0 | F 7 | 900 |
| cf. e | glossy | — | 20.0 | 50.0 | 30.0 | W 5 | — | | — |
| cf. f | glossy | 24.0 | 16.0 | 40.0 | 20.0 | W 2 | — | | — |

All coatings were applied using a tandem extrusion coating plant at a melting temperature of 310° C. and 110/160 m/min machine speed.

| Description of Testing Methods: | |
|---|---|
| Film adhesion: | The adhesion of the polyolefin resin film to the base paper was judged by pulling off a 10 mm wide strip at an angle of 180° to the direction in which it was coated. Marks were given from 1 to 5, whereby 1 means very good adhesion and 5 no adhesion at all. |
| "Note lines": | These run across the web at distances of approximately 1 mm to each other and are visible on the high-gloss surface when light falls upon it at an acute angle. The marks given were: "clearly visible" (cl.vis.), "weakly visible" (w.vis.) and "invisible" (invis.). |
| Production Interruptions: (caused by | The figures given are the web lengths (in km) which were achieved without interruptions cused by condensation, |

-continued

| Description of Testing Methods: | |
|---|---|
| build up of matter on the rollers) | build up on chill rolls or mat patches on the high-gloss surface of the coated base paper whereupon cleaning measures had to be undertaken. In all the examples the cooling water temperature of the chill roll was 10° C. |

Test results:

| Examples | Film adhesion on paper | "Note lines" at 110 m/min. | "Note lines" at 160 m/min. | Production interruptions after approx. |
|---|---|---|---|---|
| 1a | 2 | invis. | invis. | >150 (km) |
| b | 2 | " | " | >150 |
| c | 2 | " | " | >150 |
| d | 3 | " | " | >150 |
| e | 2-3 | " | " | >150 |
| f | 2 | " | " | >150 |
| g | 2 | " | " | >150 |
| cf. h | 3-4 | w.vis. | cl.vis. | >150 |
| 2a | 3 | invis. | w.vis. | >150 |
| b | 2-3 | " | invis. | >150 |
| c | 1-2 | " | " | >150 |
| d | 1-2 | " | " | >150 |
| e | 2 | " | " | 40 |
| f | 3 | " | " | 4 |
| g | 1-2 | " | " | >150 |
| h | 2 | " | " | 80 |
| i | 2 | " | " | 55 |
| k | 4 | " | " | >150 |
| cf. l | 3-4 | w.vis. | cl.vis. | >150 |
| cf. m | 3 | " | " | 75 |
| cf. n | 3 | invis. | w.vis. | 55 |
| cf. o | 4-5 | " | invis. | >150 |
| 3a | 1-2 | " | " | >150 |
| b | 1-2 | " | " | >150 |
| c | 1-2 | " | " | >150 |
| d | 3 | " | " | 5 |
| cf. e | 3 | w.vis. | cl.vis. | >150 |
| cf. f | 3-4 | " | " | 5 |

The results show that the addition of fluorine containing polymers to the coating mixtures considerably reduces or even eliminates the content of lower molecular separating agents, without note lines becoming visible on the surface of the coating.

Practically no condensation problems occurred, even a high temperatures, as a result of the reduction or elimination of low molecular separating agents so that the uneconomic cleaning work during a production run becomes almost superfluous.

In spite of the addition of fluorine containing polymers to simplify the separation of the polyolefin coats from chill rolls, the adhesion of these coats to the base paper is improved.

We claim:

1. Support material for photographic coatings comprising a paper or other film material coated on at least one side with a polyolefin resin coating, said polyolefin coating containing a fluorine containing polymer effective to facilitate separation of the coating from a chill roll during manufacture of the support material.

2. The support material of claim 1, wherein the fluorine containing polymer is present in a quantity of between about 40 and 1500 ppm.

3. The support material of claim 1, wherein the fluorine containing polymer is a polymerizate or copolymerizate with a fluorine content of between about 30–76% weight.

4. The support material of claim 1, wherein the fluorine containing polymer is a polymerizate or copolymerizate selected from the group consisting essentially of vinyl fluoride, vinylidene fluoride, trifluorochloroethylene or hexafluoropropylene.

5. The support material of claim 1, wherein the polyolefin coating contains polyether glycol.

6. The support material of claim 1, wherein said polyolefin coating contains a white pigment, and said fluorine containing polymer has a fluorine content of between about 30 to 76% weight.

7. The support material of claim 6, wherein said fluorine containing polymer is present in a quantity of between about 40–1500 ppm of the pigment containing polyolefin coating.

8. The support material of claim 6, wherein said fluorine containing polymer is a polymerisate or copolymerisate selected from the group consisting essentially of vinyl fluoride, vinylidene fluoride, trifluorochloroethylene or hexafluoropropylene.

9. The support material of claim 6, wherein said polyolefin coating contains at least one blue, red or violet color pigment in addition to said white pigment.

10. The support material of claim 7, wherein said polyolefin coating with said white pigment also contains from about 10–1000 ppm of a polyether glycol.

11. The support material of claim 6, wherein said polyolefin coating with said white pigment also contains at least one dispersing agent.

12. The support material of claim 9, wherein said polyolefin coating with said white pigment also contains at least one dispersing agent.

* * * * *